United States Patent
Peterson et al.

(10) Patent No.: US 9,979,656 B2
(45) Date of Patent: May 22, 2018

(54) METHODS, SYSTEMS, AND COMPUTER READABLE MEDIA FOR IMPLEMENTING LOAD BALANCER TRAFFIC POLICIES

(71) Applicant: Oracle International Corporation, Redwood Shores, CA (US)

(72) Inventors: Russell Bart Peterson, Westford, MA (US); Peter Commerford, Belmont, MA (US); Paul David Taylor, Chelmsford, MA (US); David Scott Thompson, Boxborough, MA (US)

(73) Assignee: Oracle International Corporation, Redwood Shores, CA (US)

( * ) Notice: Subject to any disclaimer, the term of this patent is extended or adjusted under 35 U.S.C. 154(b) by 349 days.

(21) Appl. No.: 14/961,376

(22) Filed: Dec. 7, 2015

(65) Prior Publication Data

US 2017/0163537 A1    Jun. 8, 2017

(51) Int. Cl.
*G06F 15/16* (2006.01)
*G06F 15/173* (2006.01)
(Continued)

(52) U.S. Cl.
CPC ............ *H04L 47/125* (2013.01); *H04L 43/16* (2013.01); *H04L 67/142* (2013.01)

(58) Field of Classification Search
USPC ....... 709/203, 206, 217, 219, 223, 224, 226, 709/228, 231, 232, 238; 725/93; 726/22
See application file for complete search history.

(56) References Cited

U.S. PATENT DOCUMENTS 7,406,524 B2    7/2008   Sadot et al.
7,633,969 B2   12/2009   Caugherty et al.
(Continued)

FOREIGN PATENT DOCUMENTS

CN    102624922 B    8/2014
CN    104123190 A   10/2014

OTHER PUBLICATIONS

"Traffix Signaling Delivery Controller Diameter Load Balancer: Scalability for your Control Plane," Traffix Systems, The Diameter Control Plane Experts, www.traffixsystems.com pp. 1-3 (2011).
(Continued)

*Primary Examiner* — Quang N Nguyen
(74) *Attorney, Agent, or Firm* — Jenkins, Wilson, Taylor & Hunt, P.A.

(57) ABSTRACT

The subject matter herein includes methods, systems, and computer readable media for implementing load balancer traffic policies. An exemplary method may be performed at a session load balancer (SLB) and may include receiving, at the SLB, one or more policy attributes associated with each session controller (SC) in a cluster of SCs. The method may further include configuring, at the SLB, a load balancer traffic policy based on the one or more policy attributes received from each SC in the cluster of SCs, where the load balancer traffic policy includes a distribution rate associated with each SC in the cluster of SCs. The method may further include receiving, at the SLB, a registration request for establishing a session with a SC, determining a destination SC using the load balancer traffic policy, and forwarding the registration request to the destination SC.

17 Claims, 4 Drawing Sheets

(51) Int. Cl.
*G06F 15/177* (2006.01)
*H04L 12/803* (2013.01)
*H04L 29/08* (2006.01)
*H04L 12/26* (2006.01)

(56) References Cited

U.S. PATENT DOCUMENTS

| | | | |
|---|---|---|---|
| 7,882,168 B2 * | 2/2011 | Yanagihara | G06F 17/30094 |
| | | | 709/201 |
| 8,284,205 B2 | 10/2012 | Miller et al. | |
| 8,484,656 B2 | 7/2013 | Raja et al. | |
| 8,566,928 B2 * | 10/2013 | Dagon | H04L 29/12066 |
| | | | 726/22 |
| 8,601,073 B2 | 12/2013 | Craig et al. | |
| 8,707,314 B2 | 4/2014 | Gummaraju et al. | |
| 8,776,207 B2 | 7/2014 | Mihelich et al. | |
| 8,782,645 B2 | 7/2014 | Breternitz et al. | |
| 9,332,053 B2 | 5/2016 | Sheer | |
| 2009/0228446 A1 | 9/2009 | Anzai et al. | |
| 2012/0192200 A1 | 7/2012 | Rao et al. | |
| 2012/0233486 A1 | 9/2012 | Phull et al. | |
| 2013/0339978 A1 | 12/2013 | Sander | |
| 2014/0157337 A1 * | 6/2014 | Gopalakrishnan | H04N 21/2225 |
| | | | 725/93 |
| 2014/0304413 A1 * | 10/2014 | Kondamuru | H04L 67/1017 |
| | | | 709/226 |

OTHER PUBLICATIONS

Banikazemi et al., "Profile-Based Load Balancing for Heterogeneous Clusters," pp. 1-10 (Jul. 1998).

* cited by examiner

METHODS, SYSTEMS, AND COMPUTER READABLE MEDIA FOR IMPLEMENTING LOAD BALANCER TRAFFIC POLICIES

TECHNICAL FIELD

The subject matter described herein relates to distributing traffic in a network. More particularly, the subject matter described herein relates to methods, systems, and computer readable media for distributing network traffic in a network via implementing load balancer traffic policies.

BACKGROUND

As service providers deploy larger and larger access networks, scalability problems can arise, which present various challenges from an operational standpoint. For example, edge reachability problems can occur when deployments scale beyond the number of users serviceable by a network edge. To address these issues, load balancing nodes have been introduced as a first logical hop for receiving and/or aggregating signaling traffic that enters a service provider's network.

Problems still exist, however, in determining the next-hop entity within the network after the traffic is received at the load balancing node. Currently, the load balancing node will assign new session requests to a next-hop entity according to a round robin algorithm. In this traffic distribution scheme, traffic from a new client is anchored to the next-hop entity having the lowest central processing unit (CPU) utilization rate as reported at a predetermined time interval.

This (i.e., round robin) traffic distribution scheme is problematic, as it assumes that all next-hop entities are homogeneous, meaning that each next-hop entity will perform and scale at a same level. As next-hop entitles may differ in regards to processing capabilities, round robin traffic distribution schemes can overload network entities that are slower and/or have lower processing capabilities.

The round robin traffic distribution scheme also assumes that the CPU utilization rate being reported by each next-hop entity reflects a true (real-time) indication of how "busy" the entity is. However, in some aspects, "stale" data is relied on, which may result in rejected requests and/or dropped packets. Stale data relates to the latency associated with an entity in sending periodic utilization information to the load balancer, which causes the load balancer to make incorrect assumptions based on the latent information in times of avalanche or high session establishment and before the next metric is received.

Accordingly, a need exists for methods, systems, and computer readable media for improved traffic distribution via implementing load balancer traffic policies.

SUMMARY

The subject matter described herein includes methods, systems, and computer readable media for providing intelligent load distribution and session routing via implementing load balancer traffic policies.

According to some embodiments, an exemplary method for implementing a load balancer traffic policy is provided. The method may be performed at a session load balancer (SLB) having a policy engine and/or access to a policy engine. The method may include receiving, at the SLB, one or more policy attributes associated with each session controller (SC) in a cluster of SCs. The method may include configuring, at the SLB, a load balancer traffic policy based on the one or more policy attributes received from each SC in the cluster of SCs. The load balancer traffic policy may include a distribution rate associated with each SC in the cluster of SCs. The method may include receiving, at the SLB, a registration request for establishing a session with a SC, determining, a destination SC using the load balancer traffic policy, and then forwarding the registration request to the destination SC.

According to some embodiments, an exemplary system for implementing a load balancer traffic policy is provided. An exemplary system may include a SLB configured to receive one or more policy attributes associated with each SC in a cluster of SCs and a policy engine that is accessed by and/or disposed at the SLB. The policy engine is configured with a load balancer traffic policy based on the one or more policy attributes received from each SC in the cluster of SCs. The load balancer traffic policy may include a distribution rate associated with each SC in the cluster of SCs. The policy engine may receive a registration request for establishing a session with a SC, determine a destination SC using the load balancer traffic policy, and then forward the registration request to the destination SC.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps.

Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

BRIEF DESCRIPTION OF THE DRAWINGS

The subject matter described herein will now be explained with reference to the accompanying drawings of which.

DETAILED DESCRIPTION

The subject matter described herein relates to methods, systems, and special purpose computers executing computer readable media for implementing load balancer traffic policies according to embodiments of the subject matter described herein. Rather than rejecting or denying session or registration requests and/or overloading slower network entities, the subject matter herein implements traffic policies at a session load balancer (SLB) to determine a distribution rate associated with each member of a cluster.

A distribution rate takes into account attributes associated with each individual destination endpoint or entity within a cluster of destination endpoints or entities. Such attributes may include, and are not limited to, a host throttle rate (i.e., also referred to as a "bandwidth", which is a maximum number of registration/second an entity may process), a maximum signaling rate (i.e., a maximum number of bytes/second an entity may process), a minimum percentage of untrusted (new) traffic that an entity process, and/or a maximum percentage of untrusted traffic that an entity may process. Other attributes may also be communicated for use in configuring a load balancer traffic policy at a session load balancer (SLB).

A SLB includes a discrete network element that is configured to receive all new registration requests (session traffic) from untrusted clients prior to the clients accessing a service provider's network. The SLB may be configured with a traffic policy for implementing percentage or rate based management and monitoring of a cluster of next-hop processing nodes or servers. The next-hop nodes or servers may include a cluster of session controllers (SCs, also referred to as session border controllers (SBCs)). SCs may be disposed at an edge and/or inside of a service provider's network. The SLB receives intelligence regarding the processing capabilities of the SC pool or cluster it manages, and may balance the distribution of new clients to cluster members based upon the processing capabilities. Distributing endpoints equitably among cluster members is advantageous, as it prevents overloading slower cluster members, as individual cluster members may differ in terms of bandwidth and/or processing capabilities. Notably, the subject matter herein utilizes an intelligent SLB that has some knowledge regarding the processing capabilities associated with the next-hop cluster members, so that new endpoints may be equitably distributed among the cluster members.

In some embodiments, cluster members communicate their respective processing capabilities (e.g., bandwidth or max number of new registrations/second, max signaling rate, or the like) to the SLB via packet communications. The SLB generates or is otherwise configured with a load balancer traffic policy that takes into account the processing capabilities of each respective cluster member. The processing capabilities are equalized, normalized, ratioed or otherwise balanced, and distribution rates are determined. Distribution rates may include a percentage or other number indicative of the number of new sessions to forward a respective cluster member. For example, a cluster member having a distribution rate of 30% may indicate that 30% of new registrations should be forwarded to that member. Distribution rates may be indicative of the quantity and/or signaling rate of new registrations to send cluster members. The traffic policies configured at each SC advantageously cap the SLB traffic directed to an individual SC in a way that periodic metrics cannot due to the periodic nature thereof.

New sessions are then distributed in according to the balanced distribution rates that are associated with each SC. Notably, a load balancer traffic policy used to determine distribution rates may be generated without taking into account a central processing unit (CPU) utilization (CPU %) of each cluster member, as the CPU utilizations may change dynamically. CPU utilization rates are periodically reported by each member of a cluster, but the rate may not necessarily be factored into the traffic policy algorithm. Rather, the CPU utilization rate that is reported by each cluster member may be compared to a predetermined threshold value (e.g., 90%), so that a cluster member will be excluded from the list of destination candidates when its respective CPU utilization reaches or exceeds the predetermined threshold value.

As used herein, the term "cluster" refers to a pool or group of servers, such as a group of SCs, which is collectively managed by a SLB. As used herein, the term "member" refers to individual SCs in a group of SCs that is collectively managed by the same SLB. A "cluster" may include any number of members, which may be scaled up or down, as needed.

FIGS. 1 to 4 illustrate intelligent routing and/or traffic distribution within a network via an intelligent SLB. Reference will now be made in detail to various embodiments of the subject matter described herein, examples of which are illustrated in the accompanying drawings. Wherever possible, the same reference numbers will be used throughout the drawings to refer to the same or like parts.

Figure 1:
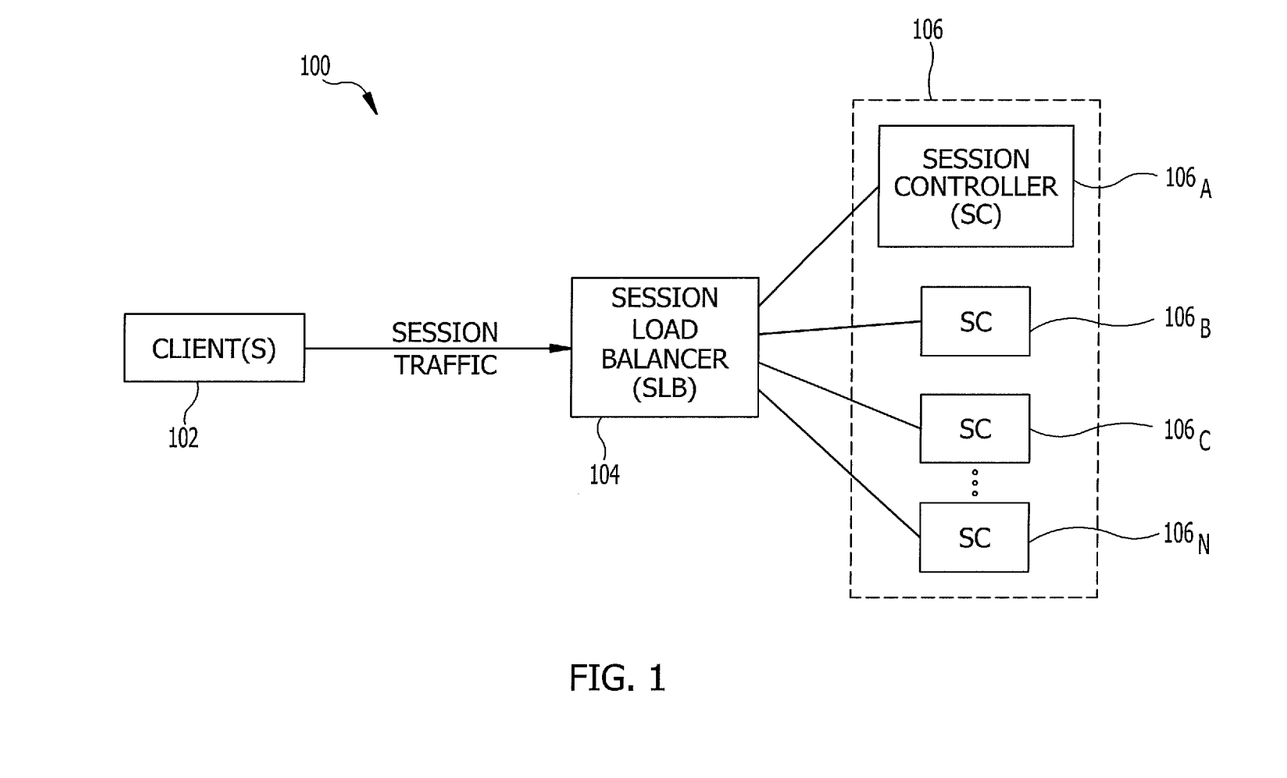
FIG. 1 is a network diagram illustrating exemplary special purpose computing entities for implementing load balancer traffic policies according to an exemplary embodiment of the subject matter described herein.

FIG. 1 illustrates an exemplary network, generally designated 100. Network 100 includes one or more clients 102 or client device utilized by at least one subscriber for communicating with a service provider's access network via a SLB 104 and/or at least one SC (e.g., $106_A$, $106_B$, $106_C$, etc.) within a cluster 106 of SCs. A cluster 106 refers to a group of SCs that is collectively managed via SLB 104. Each individual SC in cluster 106 is referred to as a "member" SC $106_A$ to $106_N$ (where "N" is a whole number integer <2), the members being collectively managed via SLB 104.

Exemplary clients 102 include any type of mobile or non-mobile device such as a phone, a computer, a smart device, a laptop computer, a tablet computer, a desktop computer, a smart planner or organizer, a smart television, a wearable computer (e.g., a watch or eyeglass mounted computer), or the like. Exemplary clients 102 are identified via a unique IP address. The one or more clients 102 may initiate multiple different sessions with SLB 104 and/or member SCs $106_A$ to $106_N$. Notably, new client sessions will be equally distributed among member SCs $106_A$ to $106_N$ according to a load balancer traffic policy that includes a distribution rate associated with each SC, which is calculated using individual attributes associated with each member SC $106_A$ to $106_N$. The distribution rates are utilized by a policy engine (e.g., 304, FIG. 3) that is either disposed at and/or accessed by SLB 104 for implementing a percentage or rate based distribution of new session traffic.

In some embodiments, the one or more clients 102 initially communicate with an access network via a logical first-hop node including SLB 104. For illustration purposes, SLB 104 is shown as the first-hop, however, as known in the art one or more additional nodes may be disposed between the one or more clients 102 and SLB 104, where desired. SLB 104 is configured receive all new registration requests, determine a single destination SC from cluster 106, and then forward the respective registration request to the destination SC that is the next-hop entity at the edge of and/or inside the subscriber provider's network.

In some embodiments, after SLB 104 assigns a client session to a SC in cluster 106, SLB 104 anchors the assigned client to the destination SC so that all subsequent traffic from the one or more clients 102 (endpoint) is forwarded to the same destination SC within cluster 106. The first packet received at SLB 104 is used to make the initial routing decision, and all subsequent packets sent through SLB 104 are forwarded to the next-hop SC in cluster 106. Packets sent between entities of network 100 may be encapsulated within an IP-in-IP format as defined in RFC 2003, entitled "IP Encapsulation within IP", the entire content of which is hereby incorporated herein by reference.

SLB 104 is configured to balance and manage the distribution of new sessions, registrations, and/or one or more clients 102 among members SCs $106_A$ to $106_N$ of cluster 106. SLB 104 balances traffic using a load balancer traffic policy determined using a load balancer traffic algorithm that takes into account individual "SC-specific" policy attributes that are associated with each individual member SC $106_A$ to $106_N$. The policy algorithm utilized by SLB 104 may optionally be updated or supplemented with other metrics, which are periodically communicated via member SCs $106_A$ to $106_N$; such metrics may include a CPU utilization rate or percentage, or the like. In some embodiments, the CPU utilization rate of each member SC $106_A$ to $106_N$ may be used as a factor for determining whether a SC will be included in a distribution pool. For example, a threshold value of CPU utilization rate may be set, and when a given member SC $106_A$ to $106_N$ reports a rate that exceeds the threshold value; it will be excluded from the list of candidates eligible to receive new session traffic. In one non-limiting exemplary embodiment, where a member SC $106_A$ to $106_N$ reports a CPU utilization rate of 90% or more, it will be excluded from the list of cluster members eligible to receive new sessions. That is, SCs exceeding a predetermined threshold CPU utilization rate will have a distribution rate of zero (0). The threshold CPU utilization rate may be set to any suitable value, such as 80%, 85%, 90%, 95%, or any other suitable threshold value, as desired.

Other metrics that may be periodically reported by each member SC $106_A$ to $106_N$ and/or assessed by SLB 104 may include a number of concurrent sessions a given member SC $106_A$ to $106_N$ can process, a maximum number of sessions a given member SC $106_A$ to $106_N$ can process, or the like.

Still referring to FIG. 1 and in some embodiments, cluster 106 includes a group of computing platform nodes or servers (e.g., member SCs $106_A$ to $106_N$), that are deployed at a front-end of a service provider's network. Cluster 106, or members thereof, support the delivery of any IP Multimedia Subsystem (IMS) service(s), Rich Communications Services (RCS) service(s), Next-Generation Network (NGN) service(s), as well as any Session initiation Protocol (SIP) application(s) not limited to voice, VoIP, video, presence, messaging, and multimedia, over any mobile or fixed line access network, including the Internet. Member SCs $106_A$ to $106_N$ enable service providers to deliver real-time packet communication services across IP network borders to one or more clients 102.

The number of member SCs $106_A$ to $106_N$ in cluster 106 may be increased or decreased (i.e., scaled up or down), as desired for efficiency. Member SCs $106_A$ to $106_N$ may include hardware computing platforms, or virtual computing platforms (i.e., having virtual processors running on a hypervisor layer that controls access to underlying processor hardware). Member SCs $106_A$ to $106_N$ may be disposed at any one geographic location and/or across multiple geographic locations, as desired. The physicality of member SCs $106_A$ to $106_N$ is not necessarily important, as like-configured, logically identical SCs can be spread all over the globe, where desired. Notably, SLB 104 is configured to equitably distribute the one or more clients 102 to individual member SCs $106_A$ to $106_N$ according to a load balancer traffic policy that incorporates SC-specific policy attributes. The SC-specific policy attributes are communicated from each member SC $106_A$ to $106_N$ to SLB 104 via a tunnel for packet transmission and reception.

As member SCs $106_A$ to $106_N$ may include different types of computing entities (e.g., heterogeneous entities), SLB 104 balances traffic (load) distributed to member SCs $106_A$ to $106_N$ according to individual (i.e., SC-specific) attributes communicated from member SCs $106_A$ to $106_N$, thereby optimizing performance of cluster 106 as a whole without overloading slower member SCs $106_A$ to $106_N$. That is, member SCs $106_A$ to $106_N$ in cluster 106 may include non-homogeneous servers or computing platforms, which may differ in terms of processing power, processing capabilities, performance, signaling bandwidth, or the like. The different processing capabilities of member SCs $106_A$ to $106_N$ are normalized so that sessions may be distributed according to a load balancer traffic policy including a distribution rate associated with each SC.

The one or more clients 102 and member SCs $106_A$ to $106_N$ are configured to communicate via exchanging (e.g., sending and receiving) packet communications across an interface. Each member SC $106_A$ to $106_N$ is configured with a policy, and may communicate its respective (SC-specific) policy attributes to SLB 104. SLB 104 then stores the policy attributes for generation and/or configuration of a load balancer traffic policy that includes a policy algorithm for determining the distribution of new session traffic (e.g., which SCs receive traffic, how often each SC receives traffic, how much traffic each SC receives, etc.). SLB 104 manages the number of clients 102 and/or client sessions served by member SCs $106_A$ to $106_N$ via balancing and/or equalizing the distribution of load (e.g., registrations or registrations per second) across member SCs $106_A$ to $106_N$ within a given cluster 106.

Still referring to FIG. 1, SLB 104 may include a discrete network element that is configured to process all endpoint signaling traffic entering a service provider's network. In some embodiments, SLB 104 processes all new SIP signaling traffic (or any other type of packet signaling traffic) received from new clients (e.g., 102). Upon receipt of a packet communication from a new (unknown) client (e.g., 102), SLB 104 uses a load balancer traffic policy to select an appropriate next-hop destination entity (e.g., member SC) to receive traffic originated by the new client. The load balancer traffic policy may be configured, generated, provisioned and/or otherwise accessed by SLB 104, and the policy includes at least an indication or specification of a distribution rate associated with each member SC $106_A$ to $106_N$ in cluster 106. The distribution rate associated with each member SC $106_A$ to $106_N$ indicates how many new registrations are to be distributed among cluster 106 members. Subsequent packets from the same client (e.g., 102) are then forwarded to the same destination SC as originally determined by SLB 104.

Each member SC $106_A$ to $106_N$ may optionally and periodically transmit health and performance data to SLB 104. For example, member SCs may transmit one or more health and performance "metrics" to SLB 104 that are evaluated and optionally used to supplement or refine the SLB 104 traffic policy. Balancing refers to the equitable distribution of clients (e.g., 102) among the member SCs $106_A$ to $106_N$ in view of SC-specific attributes compared to the processing capability of cluster 106, as a whole. SLB 104 balances traffic according to distribution rates specified by the load balancer traffic policy, thereby providing a flexible solution of directing traffic to appropriate groups of SCs. As initial packets arrive at SLB 104 from unknown (previously unseen) clients 102, the packets are processed via a policy engine that is at and/or accessible to SLB 104 to determine an appropriate destination member SC 106$_A$ to 106$_N$ for each client (e.g., 102).

In some embodiments, SLB 104 chooses a member SC 106$_A$ to 106$_N$ from among all equally weighted member SCs 106$_A$ to 106$_N$, giving preference to those with the lowest current occupancy rate (e.g., the number of clients 102 already present on a destination SC relative to its respective maximum endpoint capacity). SLB 104 stores and/or otherwise remembers the client endpoint/destination combination as a unique combination of source and destination IP address pairs, and forwards subsequent packets in a client session to the appropriate destination IP address upon identifying packets from a client endpoint (source) IP address.

In some instances, a large quantity of clients 102 may simultaneously attempt to register with SLB 104, for example, after a power outage or other "avalanche" situation. SLB 104 may be configured to support anywhere from 2 million to 10 million endpoints or clients 102. During an avalanche situation, SLB 104 may distribute the large number of clients 102 to member SCs 106$_A$ to 106$_N$ according to the traffic policy, which will prevent overwhelming slower SCs 106$_A$ to 106$_N$. Configuring SLB 104 with a load balancer traffic policy enables traffic shaping via allocating sessions according to heterogeneous SC capabilities as opposed to a mere round robin distribution scheme. Once a SC 106$_A$ to 106$_N$ is assigned its maximum number of clients 102 (e.g., it reaches or exceeds its respective maximum endpoint capacity), it is removed from the list of candidates for distribution and the policy algorithm re-calculates distribution rates for the remaining cluster members. When an SC is excluded from the list of candidates for distribution, it has a distribution rate of zero (0). Notably, the traffic policy may be dynamically configured at and/or otherwise available for use by SLB 104, thus, distribution rates may be changed and/or updated thereby adapting to real-time situations.

It will be appreciated that FIG. 1 is for illustrative purposes and that various nodes, their locations, and/or their functionality described above in relation to FIG. 1 may be changed, altered, added, or removed. For example, some nodes and/or functionality thereof may be combined into a single entity, or separated into multiple entities.

For example and in some embodiments, more than one SLB 104 may be provided per cluster 106, so that each member SC 106$_A$ to 106$_N$ receives traffic from multiple SLBs 104. This provides redundancy and scalability during avalanche situations. Any respective location and/or method of accessing the SLB 104 may be provided. As persons having skill in the art will appreciate, one or more intervening nodes (not shown) may also be deployed between clients 102 and SLB 104 and/or between SLB 104 and cluster 106 for sending, transmitting, and/or otherwise directing traffic towards a destination SC in a service provider's network.

Figure 2:
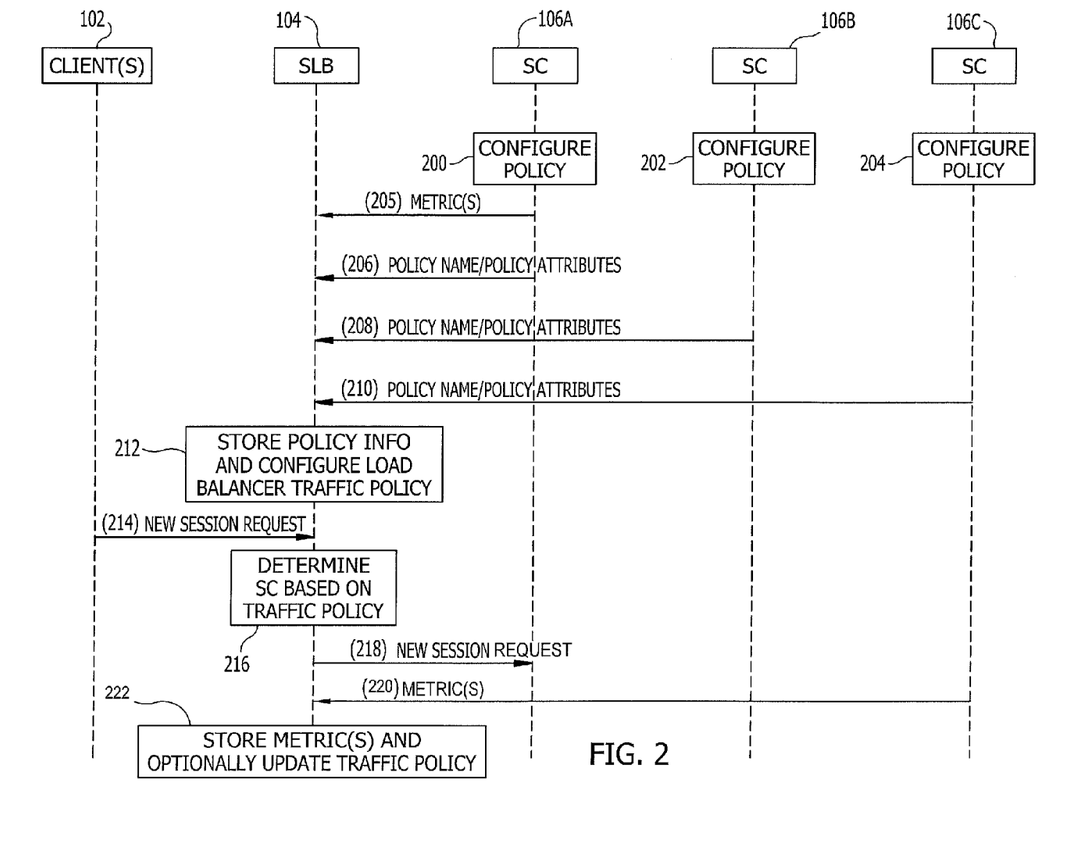
FIG. 2 is a message diagram illustrating exemplary messaging exchanged by and/or between special purpose computing entities distributing network traffic using load balancer traffic policies according to an embodiment of the subject matter described herein.

FIG. 2 is a message diagram illustrating exemplary messaging exchanged by and/or between special purpose computing entities for implementing load balancer traffic policies according to an embodiment of the subject matter described herein.

At blocks 200 to 204, each member SC 106$_A$, 106$_B$, and 106$_C$ within a cluster of SCs is configured with a policy. The SC policy (e.g., the policy configured at each SC 106$_A$, 106$_B$, and 106$_C$) may be configured by a service provider or operator, and it may include at least a policy identifier (ID) and/or one or more policy attributes. The policy attributes are characteristic of specific attributes or properties associated with each individual member SC 106$_A$ to 106$_C$. Policy attributes may be indicative of the maximum number of registrations and/or the maximum number of registrations per second the respective SC can support and/or process (i.e., also referred to as the SC's bandwidth), a maximum signaling rate the respective SC can process, or the like.

Table 1 below indicates exemplary policy information that may be configured at each member SC 106$_A$, 106$_B$, and 106$_C$, and communicated to SLB 104 for use in configuring a load balancer traffic policy at SLB 104.

TABLE 1

| | | POLICY ATTRIBUTES | | | |
|---|---|---|---|---|---|
| SC ID | POLICY ID | THROTTLE RATE (REGISTRATIONS/ SECOND) | MAX-SIGNALING-RATE (BYTES/SECOND) | MIN-UNTRUSTED % | MAX-UNTRUSTED % |
| 106$_A$ | POLICY A | 800 | 33000000 | 33 | 66 |
| 106$_B$ | POLICY B | 200 | 10000000 | 40 | 65 |
| 106$_C$ | POLICY C | 600 | 50000000 | 20 | 80 |
| 106$_N$ | POLICY N | 400 | 24000000 | 25 | 75 |

As Table 1 illustrates above, each SC (i.e., 106$_A$ to 106$_N$), may communicate its own specific policy information to SLB 104. Each SC-specific policy may include a policy ID (e.g., POLICY A, POLICY B, etc.) and one or more policy attributes. The policy attributes are used to configure a load balancer traffic policy at SLB 104. As Table 1 illustrates, SC 106$_A$ can process up to 800 registrations/second; SC 106$_B$ can process up to 200 registrations/second; SC 106$_C$ can process up to 600 registrations/second; and the Nth SC 106$_N$ can process up to 400 registrations/second.

In some embodiments, the throttle rate, the signaling rate, or the min/max untrusted percentages (e.g., a minimum percentage of untrusted traffic, a maximum percentage of untrusted traffic, and/or a percentage of new registrations per second that may be forwarded to each SC) may be normalized and configured into a load balancer traffic policy at and/or accessed by SLB 104. The load balancer traffic policy may include a distribution rate associated with each SC, which may dynamically change according to recalculation of a traffic policy algorithm as needed. The traffic policy algorithm may need to be recalculated and/or change based upon the number of SCs in cluster 106 that are available to receive new sessions. As new SCs are added or others are excluded for reaching a threshold CPU utilization rate or maximum endpoint capacity, the algorithm and distribution rates for the remaining SC members of cluster 106 should adapt. The min/max untrusted percentages or "limits" help prevent DOS attacks, where untrusted traffic causes trusted to be dropped, and it also prevents one cluster member's tunnel from interfering with another cluster member's traffic.

In some embodiments, the one or more policy attributes configured at each member SC $106_A$ to $106_N$ may include a host throttle rate having units of registrations/second, which characterizes the maximum number of registrations/second that may be processed at the respective SC. The one or more policy attributes may include a maximum signaling rate having units of bytes/second. This attribute characterizes the maximum number of bytes/second that the respective member SC can receive. The one or more policy attributes may include a minimum percentage (see e.g., Table 1, MIN-UNTRUSTED %) of the respective member SC's signaling rate that may be allocated to untrusted (new) traffic. The one or more policy attributes may include a maximum percentage (see e.g., Table 1, MAX-UNTRUSTED %) of the respective member SC's signaling rate that may be allocated to untrusted (new) traffic. For example, of all traffic distributed to member SC $106_A$, between approximately 33% and 66% may be from new (untrusted) clients 102. The remaining bandwidth is for existing (trusted or previously assigned) session traffic.

Metrics may be periodically communicated from each member SC 106 to SLB 104. For example, at line 205, first SLB $106_A$ communicates its metrics to SLB 104. The metrics may, but do not have to be used as inputs in configuring a load balancer traffic policy.

At lines 206 to 210, each member SC $106_A$, $106_B$, and $106_C$ individually communicates the policy name and/or the one or more policy attributes (Table 1) associated therewith to SLB 104. Each SC $106_A$ to $106_N$ and SLB 104 communicate packets via a signaling interface. In some embodiments, the interface includes one or more IP-in-IP tunnels that connect SLB 104 to clustered SCs $106_A$ to $106_N$.

The one or more policy attributes and the policy ID communicated at lines 206 to 210 are exemplary embodiments of policy information that may be utilized by a policy engine provided at and/or accessible by SLB 104 and configured into a policy algorithm as indicated at block 212. The policy algorithm equalizes, normalizes, or otherwise balances the policy attributes and/or policy information received from each member SC $106_A$ to $106_C$ and sets or determines a distribution rate for each member SC.

The distribution rates for each cluster member may specify how many (or the %) of new registrations that will be distributed to each member SC $106_A$ to $106_C$ in a cluster of SCs. The distribution rates may be determined by balancing (equalizing, normalizing, ratioing, or the like) one or more of the policy attributes received from member SC $106_A$ to $106_N$, for example, the distribution rate may be determined by balancing the throttle rate, maximum signaling rate, min/max untrusted %, or the like. In some embodiments, SLB 104 equitably distributes new sessions by distributing traffic according to the distribution rates associated with each SC.

Table 2 below is an exemplary embodiment of a traffic policy table that may be configured at SLB 104 at block 212. SLB 104 may use information in the policy table to equally distribute new sessions to members of a cluster.

TABLE 2

| MEMBER ID | SLB TRAFFIC POLICY ID | DISTRIBUTION RATE |
|---|---|---|
| $106_A$ | POLICY 1 | 40% |
| $106_B$ | | 10% |
| $106_C$ | | 30% |
| $106_N$ | | 20% |

As Table 2 illustrates above, a load balancer traffic policy named "POLICY 1" may be configured at SLB 104. The load balancer traffic policy includes a distribution rate associated with each member SC $106_A$ to $106_N$. The distribution rate instructs SLB 104 how to distribute traffic among members of a SC cluster. The distribution rate may be determined via equalizing policy information (attributes) received from each member SC $106_A$ to $106_C$ in a cluster.

For example, and according to the exemplary embodiment in Table 2 above, the distribution rate may be determined via normalizing the throttle rates in Table 1. The throttle rates of respective member SCs $106_A$ to $106_N$ are 800, 200, 600, and 400. When the respective throttle rates are normalized (e.g., ratioed) as a whole, the distribution rate indicates that 40% of registration requests should be forwarded to SC $104_A$, 10% of registration requests should be forwarded to SC $106_B$, 30% of registration requests should be forwarded to SC $106_C$, and 20% of registration requests should be forwarded to SC $106_N$. In Table 2, the distribution rate associated with each SC is a percentage of registrations to be forwarded to the respective SC. The distribution rate may also be a percentage of registrations per second to be forwarded to the respective SC.

If one or more member SCs $106_A$ to $106_N$ reaches or exceeds a predetermined CPU utilization rate, then that member SC $106_A$ to $106_N$ will be excluded from the distribution list, and the distribution rate will be dynamically recalculated. Similarly, if one or more member SCs $106_A$ to $106_N$ reaches its maximum endpoint capacity, then that member SC $106_A$ to $106_N$ will also be excluded from the distribution list, and the distribution rate will be dynamically recalculated. Where new SCs are added to a cluster, the distribution rate may also be dynamically recalculated. Notably, the distribution rate and traffic policy configured at SLB 104 may proactively react to avalanche situations and otherwise distribute traffic in an intelligent manner thereby avoiding overloading slower SCs.

The distribution rates associated with each SC may be determined via balancing any other attribute and/or combination of attributes received from each member SC instead of and/or in addition to the host throttle rate. The distribution rates may be stored in a traffic policy table, which may be generated, stored, configured, provisioned, updated, and/or otherwise accessed by SLB 104 for use in intelligent load distribution to individual member SCs $106_A$ to $106_N$ in a cluster of SCs to optimize performance of a SC cluster, and prevent overloading slower SCs. The distribution rates may include any number or percentage, which may be balanced or normalized to other cluster members, based on any policy attribute received from SCs $106_A$ to $106_C$.

At line 214, at least one client 102 requests access to a service provider's network and sends a registration request. The registration request is a packet communication that is received at SLB 104.

At block 216, SLB 104 determines which member SC $106_A$ to $106_C$ in a cluster of SCs will receive the client session according to a traffic policy configured at SLB 104. In some embodiments, the traffic policy includes one or more distribution rates stored a database or table (e.g., similar to Table 2) at and/or accessible to SLB 104. One SC 106$_A$ to 106$_C$ will receive the new client session based on the traffic policy configured at SLB 104. The traffic policy includes balanced distribution rates, which SLB 104 uses to equally distribute traffic to member SCs 106$_A$ to 106$_C$ without overloading SCs. The chosen SC is also referred to as a destination endpoint or designation SC.

At line 218, the registration (session) request is forwarded to a first member SC 106$_A$, as SLB 104 determined the routing according to the traffic policy. All subsequent session traffic from client 102 will be forwarded to first member SC 106$_A$.

At line 220 member SC 106$_C$ may optionally send periodic metrics to SLB 104. At block 222, SLB 104 stores the metrics received from member SC 106$c$ and optionally update the traffic policy according to the metrics. Each member SC 106$_A$ to 106$_C$ may periodically transmit metrics such as CPU utilization rate, occupancy rate, or the like. Updating the traffic policy at block 224 may include recalculating the distribution rates based on more or less member SCs 106$_A$ to 106$_C$ being provided. Should a member SC 106$_A$ to 106$_C$ exceed a threshold CPU utilization %, it will be excluded from the list of SCs and the distribution rates may be recalculated using the policy information that was initially communicated in blocks 200 to 204.

It will be appreciated that FIG. 2 is for illustrative purposes only and that additional steps and/or messaging other than that depicted in FIG. 2 can be used for balancing load and/or distributing traffic to member SCs in a cluster. Additionally, it will be appreciated that steps depicted in FIG. 2 can occur in a different order than depicted, or steps may be combined.

Figure 3:
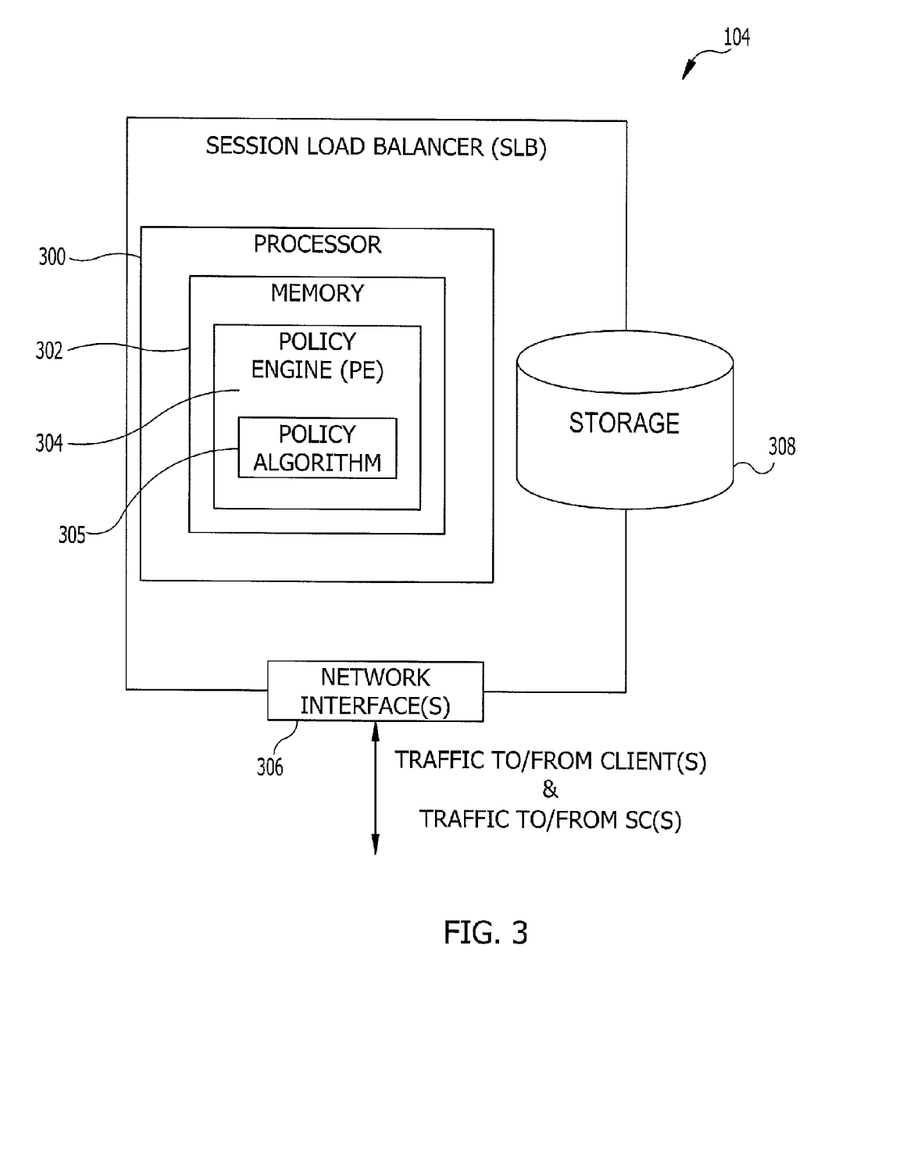
FIG. 3 is a block diagram illustrating a special purpose computing entity including a session load balancer (SLB) suitable to distribute network traffic via implementing traffic policies according to an embodiment of the subject matter described herein.

FIG. 3 is a block diagram illustrating a special purpose computer including SLB 104 for implementing one or more load balancer traffic policies for balancing the distribution of new client sessions according to an embodiment of the subject matter described herein.

Referring to FIG. 3, SLB 104 includes at least one processor 300, at least one memory 302, a policy engine 304 stored in memory 302, at least one network interface 306, and storage 308 (e.g., a storage element or device).

Processor 300 may include a physical hardware processor having a single core or multiple cores. Processor 300 may also be a virtual processor that runs on a hypervisor layer that control access to underlying processor hardware.

Memory 302 may be volatile or non-volatile memory that stores instructions executed by processor 300. As with processor 300, memory 302 may be a physical memory chip or virtualized memory that is mapped to one or more physical memory chips by a hypervisor layer.

Network interface 306 may be a physical or virtual interface for sending packets to and receiving packets from clients (102, FIG. 1) and/or one or more SCs (106$_A$ to 106$_N$, FIG. 1). In some embodiments, network interface 306 is configured to send and/or receive policy information and/or session requests. In other embodiments, network interface 306 is configured to send, receive, and/or forward message traffic between clients and SCs.

In the illustrated example, memory 302 stores policy engine 304, which includes a policy algorithm 305. For illustration purposes, policy engine 304 is shown as being locally disposed at SLB 104, however, a remote (separate) policy engine 304 may also be provided, which is accessible to and/or accessed by SLB 104.

Policy engine 304 has access to information contained in storage 308. The information contained in storage 308 is used to configure, update, modify, and/or refine policy algorithm 305. The information contained in storage 308 may include information received from SCs, including respective SC attributes (e.g., host throttle rate, signaling rate, etc.) and/or SC metrics (e.g., CPU utilization rate, occupancy rate, maximum endpoint capacity, or the like). Storage 308 may also include mappings between clients and SCs, once assigned, so that subsequent traffic is forwarded to a same (previously assigned) SC. Storage 308 may include one or more databases or tables having information stored therein for providing intelligent load distribution without overloading individual SCs (or reducing the potential for overloading individual SCs) in a cluster of SCs.

SLB 104 is configured to access and/or execute policy engine 304 prior to distributing new client traffic to members of a SC cluster. Upon execution by processor 300, policy engine 304 executes policy algorithm 305 for assessing distribution rates and determining a destination SC in a cluster of SCs for routing and assigning traffic. SLB 104 may also access storage 308 to determine SC assignments, so that traffic associated with previously assigned client sessions is continually routed to the same SC. Policy algorithm 305 may be recalculated as needed, for example, when SCs are scaled up or down (e.g., as new SCs are brought online, or SCs may be excluded from distribution where they reach or exceed threshold CPU utilization rate and/or maximum capacity).

SLB 104 is a special purpose computer and/or a special purpose computing platform, which is configured to reduce the potential for dropping registration requests and/or from overloading one or more SCs in a cluster managed by SLB 104. SLB 104 includes functionality that allows service providers the opportunity to better utilize and manage all the SCs deployed in a network such that overloaded components will not disrupt services provided to one or more clients. Moreover, SLB 104 implements intelligent server (i.e., SC) assignment and routing via a traffic policy configured using SC-specific policy information or attributes.

It is understood that the architecture illustrated in FIG. 3 is exemplary and simplified in that SLB 104 may include additional or alternative components without departing from the scope of the subject matter described herein. In some embodiments, SLB 104 may be implemented on a processor blade in a rack-mounted system. Multiple processor blades may plug into a backplane to form a shelf. In other embodiments, SLB 104 may include a virtual server that runs on a hypervisor layer that shares access to underlying hardware, such as processor, memory, and network interfaces.

It will further be appreciated that FIG. 3 is for illustrative purposes and that various components, their locations, and/or their functions described above in relation to FIG. 3 may be changed, altered, added, and/or removed.

Figure 4:
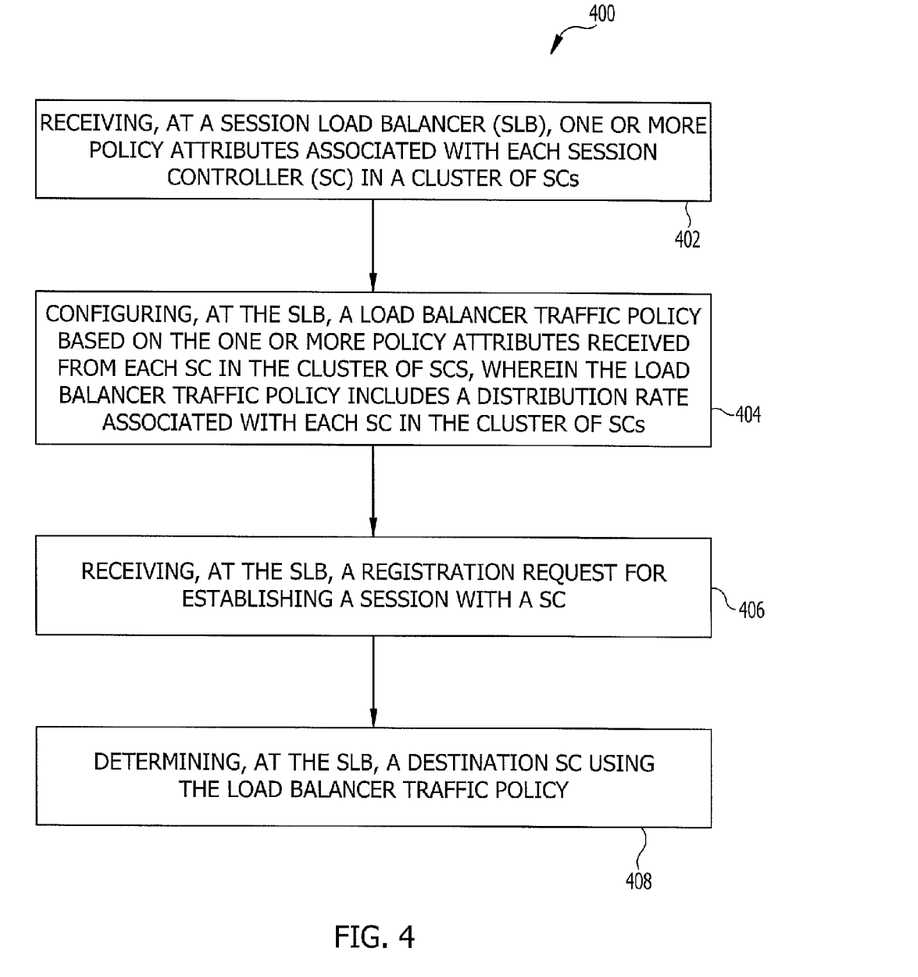
FIG. 4 is a flow chart illustrating an exemplary process for implementing load balancer traffic policies via a special purpose computer according to an embodiment of the subject matter described herein.

FIG. 4 is a flow chart illustrating an exemplary process generally designated 400 for implementing load balancer traffic policies according to an embodiment of the subject matter described herein. In some embodiments, process 400 is performed at a SLB, for example, upon deployment and/or provision of a service provider network having a SLB.

In block 402, the SLB receives one or more policy attributes associated with each SC in a cluster of SCs. Each SC in a cluster of SCs may be configured with a traffic policy that may be identified with a policy ID and policy attributes. The policy attributes may include SC-specific policy information such as a host throttle rate (i.e., the max number of registrations/second a given SC may process), a maximum signaling rate (i.e., bytes/second), min/max untrusted percentages, or the like. Each SC may communicate this information to SLB via an interface, such as an IP-in-IP tunnel that facilitates packet communications.

In block 404, the SLB is configured with a load balancer traffic policy based on the one or more policy attributes received from each SC in the cluster of SCs. In some embodiments, the load balancer traffic policy includes a distribution rate associated with each SC in the cluster of SCs. Configuring a load balancer traffic policy at SLB may include consulting a policy engine that has access to SC-specific policy information or attributes. The policy engine may execute and have stored therein a policy algorithm. The policy algorithm may normalize or equalize all of the SC-specific policy attributes, and generate a distribution rate associated with each SC. Traffic or load will be distributed to each SC in a cluster of SCs according to the respective distribution rate. For example, a SC associated with a distribution rate of 40% may indicate that four of every ten new registration requests received at the SLB will be distributed to the SC that has the distribution rate of 40%. The traffic policy may be updated as the number and processing capabilities of a SC cluster changes.

In block 406, the SLB receives a new registration request for establishing a session with a SC. The new registration request may be originated at an untrusted (new) client. The SLB will consult the policy engine and forward the message according to the traffic policy and distribution rates determined using SC-specific information.

In block 408, the SLB determines a destination SC using the load balancer traffic policy. The new registration request may then be forwarded to the destination SC.

It will be appreciated that process 400 is for illustrative purposes and that different and/or additional actions may be used. It will also be appreciated that various actions described herein may occur in a different order or sequence.

Intelligent load distribution and cluster management as described herein improves the technological field of server (e.g., SC) assignment, allocation, and utilization by virtue of the user-defined networking that may be achieved via implementation of configurable, dynamic traffic policies. By implementing intelligent load distribution and cluster management via dynamically configurable traffic policies, network efficiency also increases. Moreover, systems, methods, and computer readable media herein are configured to protect against overloading a network and/or components thereof, which is important during avalanche events. The subject matter herein further maximizes the services provided to clients and reduces damage caused by receiving traffic higher than a SCs rated capacity.

Intelligent load distribution as described herein functions on special purpose computers, computing entities, and/or computing platforms, such as a SLB (e.g., 104) that receives input from SCs (e.g., $106_A$ to $106_N$). Intelligent load distribution and routing cannot be performed manually, as routing packets in a packet network and other services provided via SLBs and SCs are necessarily rooted in computing technology.

The intelligent load distribution and traffic policy functionality described herein improves the functionality and/or efficiency associated with SC assignment, SC allocation and/or SC utilization within a network, as balancing the load distribution among cluster members becomes more intelligent, simplified, and less costly. The equitable load distribution and functionality of SLB as described herein also improves network communications as the number of rejected requests, dropped packets, and overloaded servers (i.e., SCs) is minimized.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for implementing a load balancer traffic policy, the method comprising:
   at a session load balancer (SLB):
     receiving, at the SLB, one or more policy attributes associated with each session controller (SC) in a cluster of SCs;
     configuring, at the SLB, a load balancer traffic policy based on the one or more policy attributes received from each SC in the cluster of SCs, wherein the load balancer traffic policy includes a distribution rate associated with each SC in the cluster of SCs;
     receiving, at the SLB, a registration request for establishing a session with a SC;
     determining, at the SLB, a destination SC using the load balancer traffic policy; and
     forwarding the registration request to the destination SC;
   wherein the distribution rate associated with each SC is a percentage of new registrations to be forwarded to each SC;
   wherein the distribution rate is determined without taking into account a central processing unit (CPU) utilization rate associated with each SC in the cluster of SCs.

2. The method of claim 1, wherein the one or more policy attributes includes a host throttle rate that is associated with each respective SC in the cluster of SCs.

3. The method of claim 1, wherein the one or more policy attributes includes a maximum signaling rate that is associated with each respective SC in the cluster of SCs.

4. The method of claim 1, wherein the one or more policy attributes includes a maximum percentage of untrusted traffic that is associated with each respective SC in the cluster of SCs.

5. The method of claim 1, wherein the one or more policy attributes include a minimum percentage of untrusted traffic that is associated with each respective SC in the cluster of SCs.

6. The method of claim 1, wherein any SC in the cluster of SCs that reaches or exceeds a predetermined threshold value regarding a central processing unit (CPU) utilization rate has a distribution rate of zero.

7. The method of claim 1, wherein any SC in the cluster of SCs that reaches a respective maximum endpoint capacity has a distribution rate of zero.

8. The method of claim 1, wherein the cluster of SCs includes hardware computing platforms and virtual computing platforms.

9. A system for implementing load balancer traffic policies, the system comprising:
   a session load balancer (SLB) configured to receive one or more policy attributes associated with each session controller (SC) in a cluster of SCs; and
   a policy engine accessed by the SLB, wherein the policy engine is configured with a load balancer traffic policy based on the one or more policy attributes received from each SC in the cluster of SCs, wherein the load balancer traffic policy includes a distribution rate associated with each SC in the cluster of SCs, wherein the policy engine is configured to receive a registration request for establishing a session with a SC, determine a destination SC using the load balancer traffic policy, and forward the registration request to the destination SC;

wherein the distribution rate associated with each SC is a percentage of new registrations to be forwarded to each SC;

wherein the load balancer traffic policy does not take into account a central processing unit (CPU) utilization rate associated with each SC in the cluster of SCs.

10. The system of claim 9, wherein the one or more policy attributes includes a host throttle rate that is associated with each respective SC in the cluster of SCs.

11. The system of claim 9, wherein the one or more policy attributes includes a maximum signaling rate that is associated with each respective SC in the cluster of SCs.

12. The system of claim 9, wherein the one or more policy attributes includes a maximum percentage of untrusted traffic that is associated with each respective SC in the cluster of SCs.

13. The system of claim 9, wherein the one or more policy attributes include a minimum percentage of untrusted traffic that is associated with each respective SC in the cluster of SCs.

14. The system of claim 9, wherein any SC in the cluster of SCs that reaches or exceeds a predetermined threshold value regarding a central processing unit (CPU) utilization rate has a distribution rate of zero.

15. The system of claim 9, wherein any SC in the cluster of SCs that reaches a respective maximum endpoint capacity has a distribution rate of zero.

16. The system of claim 9, wherein the cluster of SCs includes hardware computing platforms and virtual computing platforms.

17. A non-transitory computer readable medium having stored thereon executable instructions that when executed by a processor of a computer control the computer to perform steps comprising:

receiving, at a session load balancer (SLB), one or more policy attributes associated with each session controller (SC) in a cluster of SCs;

configuring, at the SLB, a load balancer traffic policy based on the one or more policy attributes received from each SC in the cluster of SCs, wherein the load balancer traffic policy specifies a distribution rate associated with each SC in the cluster of SCs;

receiving, at the SLB, a registration request for establishing a session with a SC;

determining, at the SLB, a destination SC using the load balancer traffic policy; and forwarding the registration request to the destination SC;

wherein the distribution rate associated with each SC is a percentage of new registrations to be forwarded to each SC;

wherein the distribution rate is determined without taking into account a central processing unit (CPU) utilization rate associated with each SC in the cluster of SCs.

\* \* \* \* \*

UNITED STATES PATENT AND TRADEMARK OFFICE
CERTIFICATE OF CORRECTION

PATENT NO. : 9,979,656 B2
APPLICATION NO. : 14/961376
DATED : May 22, 2018
INVENTOR(S) : Peterson et al.

Page 1 of 1

It is certified that error appears in the above-identified patent and that said Letters Patent is hereby corrected as shown below:

In the Specification

In Column 8, Line 14, delete "1068," and insert -- $106_B$, --, therefor.

In Column 8, Line 26, delete "1068," and insert -- $106_B$, --, therefor.

In Column 11, Line 16, delete "106c" and insert -- $106_C$ --, therefor.

Signed and Sealed this
Sixth Day of November, 2018

Andrei Iancu
*Director of the United States Patent and Trademark Office*